United States Patent
Rossiter

(10) Patent No.: US 9,658,408 B2
(45) Date of Patent: May 23, 2017

(54) REINFORCED OPTICAL FIBER CABLE

(71) Applicant: FINISAR CORPORATION, Sunnyvale, CA (US)

(72) Inventor: Edward R. Rossiter, Warrington, PA (US)

(73) Assignee: Finisar Corporation, Sunnyvale, CA (US)

( * ) Notice: Subject to any disclaimer, the term of this patent is extended or adjusted under 35 U.S.C. 154(b) by 10 days.

(21) Appl. No.: 14/595,399

(22) Filed: Jan. 13, 2015

(65) Prior Publication Data
US 2016/0202436 A1    Jul. 14, 2016

(51) Int. Cl.
G02B 6/44    (2006.01)
G02B 6/38    (2006.01)
G02B 6/02    (2006.01)

(52) U.S. Cl.
CPC ........ *G02B 6/3887* (2013.01); *G02B 6/02395* (2013.01); *G02B 6/3861* (2013.01); *G02B 6/4433* (2013.01); *G02B 6/4486* (2013.01)

(58) Field of Classification Search
CPC .. G02B 6/4433; G02B 6/3861; G02B 6/4486; G02B 6/02395
USPC ................................. 385/100–114
See application file for complete search history.

(56) References Cited

U.S. PATENT DOCUMENTS

| | | | | |
|---|---|---|---|---|
| 4,854,668 A * | 8/1989 | Mayr | ................... | G02B 6/4486 385/128 |
| 5,054,883 A * | 10/1991 | Eckberg | ................ | C03C 25/105 385/145 |
| 5,139,816 A * | 8/1992 | Eckberg | ................ | C03C 25/105 427/163.2 |
| 5,381,504 A * | 1/1995 | Novack | ................. | C03C 25/106 385/128 |
| 6,018,606 A * | 1/2000 | Sogabe | ................ | G02B 6/3855 385/134 |
| 6,048,911 A * | 4/2000 | Shustack | ............... | C03C 25/106 428/378 |
| 6,485,191 B1 * | 11/2002 | Sato | ..................... | G02B 6/4206 385/73 |
| 6,668,122 B2 * | 12/2003 | Kozakai | ................ | C03C 25/106 385/128 |
| 6,895,156 B2 * | 5/2005 | Walker, Jr. | ......... | G02B 6/02395 385/128 |
| 6,920,255 B2 * | 7/2005 | Hasui | ..................... | G02B 6/264 385/11 |
| 8,358,894 B2 * | 1/2013 | Martin-Regalado | ... | G02B 6/443 385/100 |
| 8,374,474 B2 * | 2/2013 | Chou | ................. | G02B 6/02395 385/100 |
| 8,753,021 B1 * | 6/2014 | Baca | .................... | G02B 6/3861 385/76 |

(Continued)

*Primary Examiner* — Ryan Lepisto
*Assistant Examiner* — Guy Anderson
(74) *Attorney, Agent, or Firm* — Maschoff Brennan

(57) ABSTRACT

An optical fiber cable may include an optical fiber that extends from a first end to a second end. The optical fiber may include a core that extends from the first end to the second end, a cladding that surrounds the core and extends from the first end to the second end, and a coating that surrounds the cladding and extends from the first end to the second end. A first length of flexible epoxy may surround a length of the coating from the first end to a first intermediate point of the optical fiber.

20 Claims, 4 Drawing Sheets

(56) References Cited

U.S. PATENT DOCUMENTS

| | | | | |
|---|---|---|---|---|
| 8,811,788 | B2* | 8/2014 | Sasaki | G02B 6/443 |
| | | | | 385/126 |
| 9,039,295 | B2* | 5/2015 | Fewkes | G02B 6/3861 |
| | | | | 385/80 |
| 9,086,548 | B2* | 7/2015 | Derosa | G02B 6/3861 |
| 9,285,536 | B2* | 3/2016 | Homma | G02B 6/02395 |
| 2002/0076555 | A1* | 6/2002 | Kozakai | C03C 25/1065 |
| | | | | 428/375 |
| 2002/0106161 | A1* | 8/2002 | Kiani | G02B 6/3612 |
| | | | | 385/53 |
| 2010/0316334 | A1* | 12/2010 | Kewitsch | G02B 6/3502 |
| | | | | 385/78 |
| 2014/0199040 | A1* | 7/2014 | Sohma | C03C 25/106 |
| | | | | 385/128 |
| 2014/0321812 | A1* | 10/2014 | Bauco | G02B 6/3855 |
| | | | | 385/78 |
| 2015/0192734 | A1* | 7/2015 | Homma | G02B 6/02395 |
| | | | | 385/102 |

\* cited by examiner

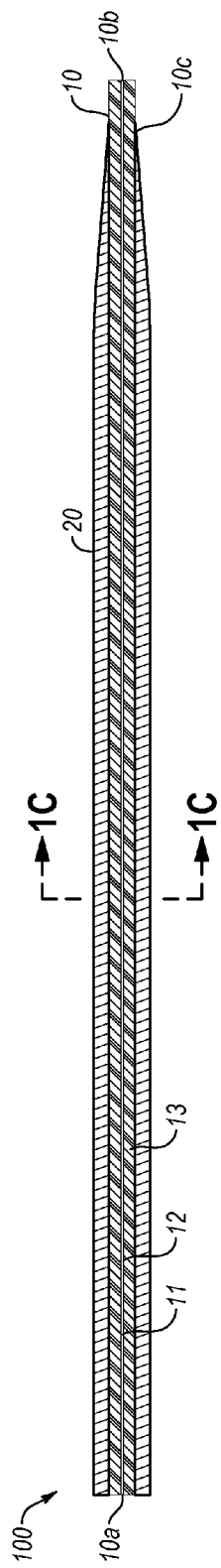
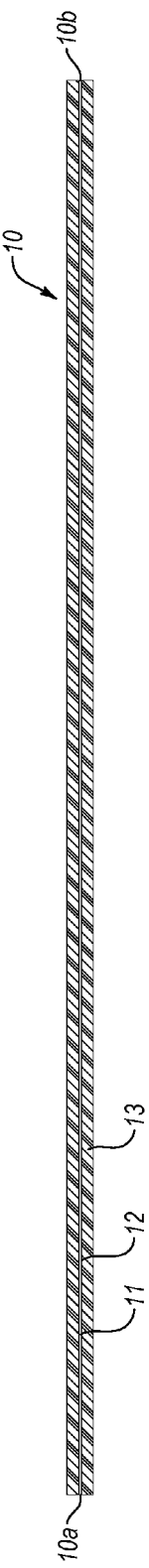
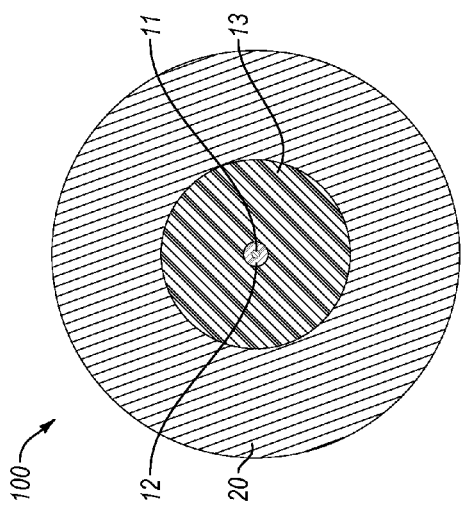
Fig. 1A
Fig. 1B
Fig. 1C

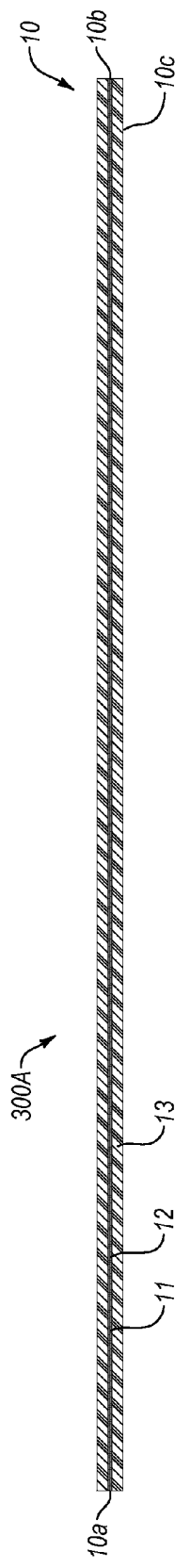
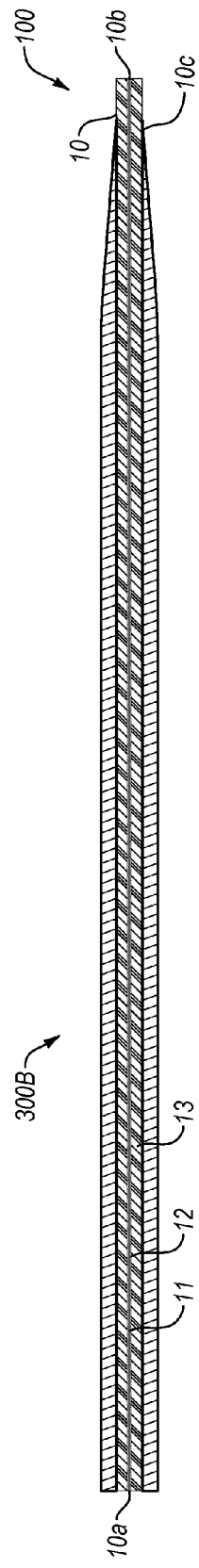
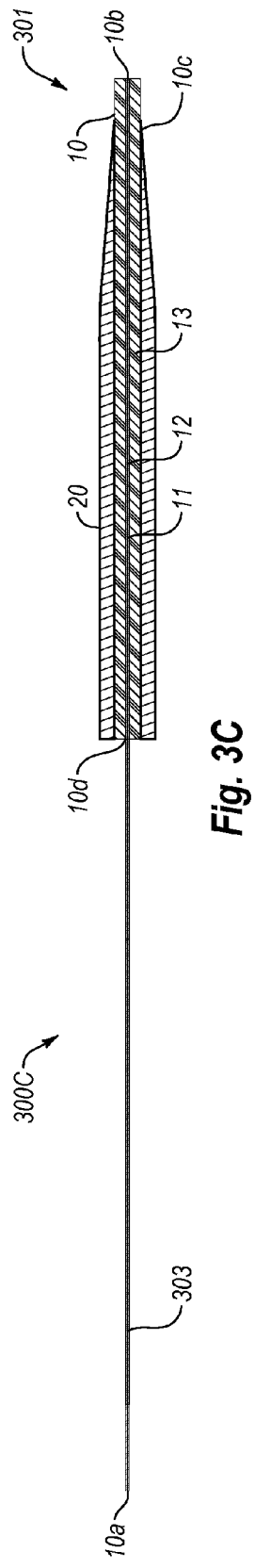
Fig. 3A
Fig. 3B
Fig. 3C

REINFORCED OPTICAL FIBER CABLE

BACKGROUND

1. Field

Embodiments disclosed herein relate to optical fiber cables or implementations thereof suitable for use with optical fiber installations.

2. Related Technology

Conventional optical fiber cables include an optical fiber having a core, a cladding, and a coating. The size of a cable is commonly referred to by the outer diameters of its respective core, cladding, and coating. For example, a 50/125/250 cable indicates a cable having a core with a diameter of 50 micrometers, a cladding with a diameter of 125 micrometers, and a coating with a diameter of 250 micrometers.

In many optical fiber installations, it has become desirable to minimize the cross-sectional thickness of the individual optical fiber cables of the installation in order to save space and allow room for more connections. This has resulted in a dramatic trend toward the use of thinner cables in installations. However, the trend towards thinner cables has also given rise to concerns regarding durability, as thinner cables tend to be more fragile. A particular point of concern is the connection point between an optical fiber cable and an optical assembly, such as a transmitter optical subassembly (herein, "TOSA") or a receiver optical subassembly (herein, "ROSA").

To facilitate connection of the optical fiber cable to the optical assembly, a connection component such as a ferrule may be operably coupled to an end of the optical fiber cable. The connection component may be configured to engage with a receptacle of the optical assembly at a connection point. The connection point between the optical fiber cable and optical assembly has been an area of particular durability concerns because the cable may be subjected to a tensile force when the connection component is operably connected to the optical assembly and to localized bending forces when the connection component is manipulated. Because an epoxy within the connection component may be configured to fixedly secure the length of optical fiber therein, the epoxy may improperly disperse these forces onto the cable, resulting in the formation of cracks along the core and the cladding of the optical fiber. If the forces are sufficiently sustained or severe, the core and/or the cladding may even break.

The subject matter claimed herein is not limited to embodiments that solve any disadvantages or that operate only in environments such as those described above. Rather, this background is only provided to illustrate one example technology area where some embodiments described herein may be practiced.

SUMMARY

Some example embodiments described herein generally relate to optical fiber cables or implementations thereof suitable for use with optical fiber installations.

An example embodiment may include an optical fiber cable. The optical fiber cable may include an optical fiber that extends from a first end to a second end, the optical fiber including a core that extends from the first end to the second end, a cladding that surrounds the core and extends from the first end to the second end, and a coating that surrounds the cladding and extends from the first end to the second end. A first length of flexible epoxy may surround a length of the coating from the first end to a first intermediate point of the optical fiber. The first intermediate point may be between the first end and the second end, and the first length of flexible epoxy may not extend beyond the first intermediate point of the optical fiber.

Another example embodiment may include an optical fiber cable assembly including an optical fiber. The optical fiber may extend from a first end to a second end, and may include a core that extends from the first end to the second end, a cladding that surrounds the core and extends from the first end to the second end, and a coating that surrounds the cladding and extends from a first coating end to a second coating end, the first coating end and the second coating end disposed between the first end and the second end. A flexible epoxy may surround the coating of the optical fiber from the first coating end to a first intermediate point of the optical fiber. A rigid epoxy may surround lengths of the optical fiber and the flexible epoxy from the first end to a second intermediate point of the optical fiber, the second intermediate point disposed between the first coating end and the first intermediate point. A ferrule that may surround the rigid epoxy from the first end to a third intermediate point of the optical fiber, the third intermediate point disposed between the first end and the second intermediate point. The ferrule may be configured to engage with a receptacle of an optical assembly.

In another example embodiment, a method to prepare an optical fiber for connection to an optical assembly may include dipping a length of the optical fiber from a first end of the optical fiber to a first intermediate point between the first end and a second end of the optical fiber into an uncured flexible epoxy. The optical fiber may include a core surrounded by a cladding and a coating that surrounds the cladding along at least a portion of the length of the optical fiber. The method may further include removing the optical fiber from the uncured flexible epoxy to form a residual layer of uncured flexible epoxy on the optical fiber and curing the residual layer of uncured flexible epoxy to form a layer of flexible epoxy that surrounds the coating from the first end to the first intermediate point of the optical fiber.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the embodiments will be set forth in the description which follows, and in part will be obvious from the description, or may be learned by the practice of the embodiments. The features and advantages of the embodiments may be realized and obtained by means of the instruments and combinations particularly pointed out in the appended claims. These and other features of the embodiments will become more fully apparent from the following description and appended claims, or may be learned by the practice of the embodiments as set forth hereinafter.

BRIEF DESCRIPTION OF THE DRAWINGS

To further clarify the above and other advantages and features of the present embodiments, a more particular description of the embodiments will be rendered by reference to the appended drawings. It is appreciated that these drawings depict only typical embodiments and are therefore not to be considered limiting of its scope. The embodiments will be described and explained with additional specificity and detail through the use of the accompanying drawings in which:

FIG. 1A illustrates a cross-sectional side view of a portion of an optical fiber cable including an optical fiber and a layer of flexible epoxy;

FIG. 1B illustrates a cross-sectional side view of the optical fiber of FIG. 1A;

FIG. 1C illustrates a magnified cross-sectional view of the optical fiber of FIG. 1A;

FIGS. 3A-3D illustrate various stages in a method to prepare and/or connect an optical fiber to an optical assembly.

DETAILED DESCRIPTION OF SOME EXAMPLE EMBODIMENTS

Figure 2:
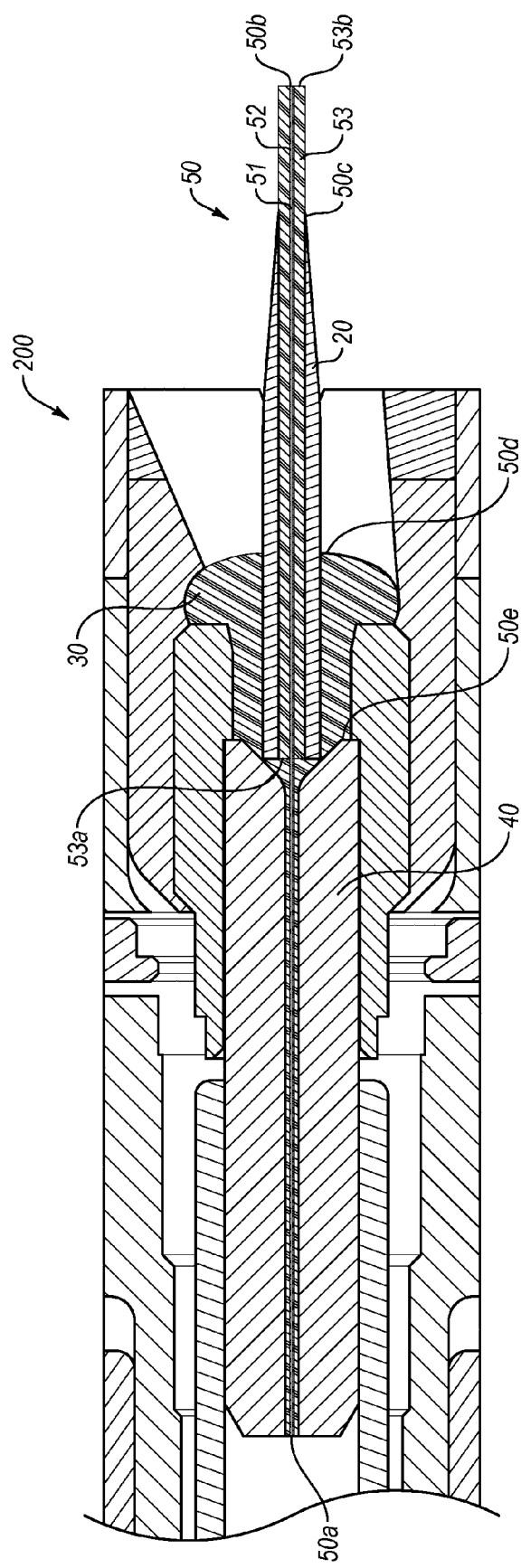
FIG. 2 illustrates a cross-sectional side view of an optical fiber assembly including an optical fiber, a layer of rigid epoxy, a layer of flexible epoxy, and a ferrule.

Particular embodiments of the present disclosure will be described with reference to the accompanying drawings. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of configuration, all of which are explicitly contemplated herein.

Embodiments of the present disclosure will now be explained with reference to the accompanying figures.

FIGS. 1A and 1C illustrate, respectively, a cross-sectional side view and a cross-sectional view of a portion of an optical fiber cable 100, arranged in accordance with at least some embodiments described herein. The optical fiber cable 100 may include an optical fiber 10 and a first length of flexible epoxy 20. The optical fiber 10 may extend from a first end 10a to a second end 10b and may include a core 11, a cladding 12, and a coating 13, the coating 13 defining a diameter of approximately 250 micrometers (e.g., 225-275 micrometers). The flexible epoxy 20 may surround the coating 13 of the optical fiber 10 and may extend from the first end 10a to a first intermediate point 10c of the optical fiber 10. The flexible epoxy 20 may define a first diameter of approximately 400 micrometers (e.g., 375-425 micrometers) at the first end 10a and may taper into a second diameter of approximately 250 micrometers (e.g., 225-275 micrometers) at the first intermediate point 10c. The flexible epoxy 20 may extend to approximately 30 millimeters (e.g., 25-35 millimeters) in length from the first end 10a, and may terminate at the first intermediate point 10c.

The flexible epoxy 20 may include a light-curable epoxy, such as a UV acrylic cured by ultraviolet (UV) or visible light. In its cured form as shown on the optical fiber cable 100, the flexible epoxy 20 may define a shore hardness ranging between 20 D and 40 D, a tensile strength between 15 Newtons per square millimeter (N/mm2) and 21 N/mm2, and a Young's Modulus ranging between 30 N/mm2 and 180 N/mm2.

Modifications, additions, or omissions may be made to the optical fiber cable 100 without departing from the scope of the present disclosure. The proportions, dimensions, and length of the optical fiber cable 100 may vary, including those of the optical fiber 10 or the flexible epoxy 20. The flexible epoxy 20 may include any one or more of a variety of different materials. The location of the first intermediate point 10c may vary according to the requirements of specific implementations. Furthermore, a second length of flexible epoxy 20 may surround the second end 10b of the optical fiber 10 in a manner structurally similar to the first end 10a.

FIG. 2 illustrates a cross-sectional side view of an optical fiber assembly 200, arranged in accordance with at least some embodiments described herein. The optical fiber assembly 200 may include an optical fiber 50, a first length of flexible epoxy 20, a first length of rigid epoxy 30, and a ferrule 40.

The optical fiber 50 may include a core 51, a cladding 52, and a coating 53. The core 51 and the cladding 52 may extend from a first end 50a to a second end 50b of the optical fiber 50. The coating 53 may extend from a first coating end 53a to a second coating end 53b. The first and second coating ends 53a, 53b may be respectively disposed at and/or between the first and second ends 50a, 50b of the optical fiber 50.

The flexible epoxy 20 may surround the coating 53 of the optical fiber 50 and may extend from the first coating end 53a to a first intermediate point 50c of the optical fiber 50 located between the first and second ends 50a, 50b. The first intermediate point 50c may be approximately half an inch (e.g., 0.3-0.7 inches) beyond the end of the ferrule 40 in some implementations.

The rigid epoxy 30 may surround the optical fiber 50 and the flexible epoxy 20 and may extend from the first end 50a to a second intermediate point 50d of the optical fiber 50. The rigid epoxy 30 may extend approximately 1 millimeter (e.g., 0.6-1.2 millimeters) beyond the end of the ferrule 40 in some implementations. The second intermediate point 50d may be disposed between the first coating end 53a and the first intermediate point 50c. The rigid epoxy 30 may include a shore hardness greater than 85 D, a lap shear strength greater than 13.7 Newtons per square millimeter (N/mm2), and a die shear strength greater than 35 N/mm2 and may be configured to secure lengths of the core 51 and the cladding 52 within the ferrule 40.

The ferrule 40 may surround the rigid epoxy 30 and may generally extend from the first end 50a to a third intermediate point 50e of the optical fiber 50. The third intermediate point 50e may be disposed between the first end 50a and the second intermediate point 50d. In some embodiments, the third intermediate point 50e may be disposed between the first coating end 53a and the second intermediate point 50d, such that the ferrule 40 may surround lengths of the rigid epoxy 30 and the flexible epoxy 20. In these and other embodiments, the ferrule 40 may contact the flexible epoxy 20 at its first coating end 53a. Accordingly, the flexible epoxy 20 may evenly disperse tensile and localized forces (not shown) between the first coating end 53a and the first intermediate point 50c that are commonly present when the optical fiber assembly 200 is manipulated.

The ferrule 40 may be configured to receive lengths of the core 51 and the cladding 52 and to engage with a receptacle of an optical assembly (not shown), such that the core 51 and the cladding 52 guided therethrough may communicate with the optical assembly. In some embodiments, the ferrule 40 may align with a connector plugged into the optical assembly.

Modifications, additions, or omissions may be made to the optical fiber assembly 200 without departing from the scope of the present disclosure. The proportions, dimensions, and length of the optical fiber assembly 200 may vary, including those of the optical fiber 50, the flexible epoxy 20, the rigid epoxy 30, or the ferrule 40. The flexible and rigid epoxies 20, 30 may include any of a variety of different materials. The location of the first, second, and third intermediate points 50c, 50d, 50e may vary according to the requirements of specific implementations. Furthermore, second lengths of the flexible and rigid epoxies 20, 30, as well as a second ferrule 40 may surround the second end 50b of the optical fiber 50, in a manner structurally similar to the first end 50a.

Figure 3D:
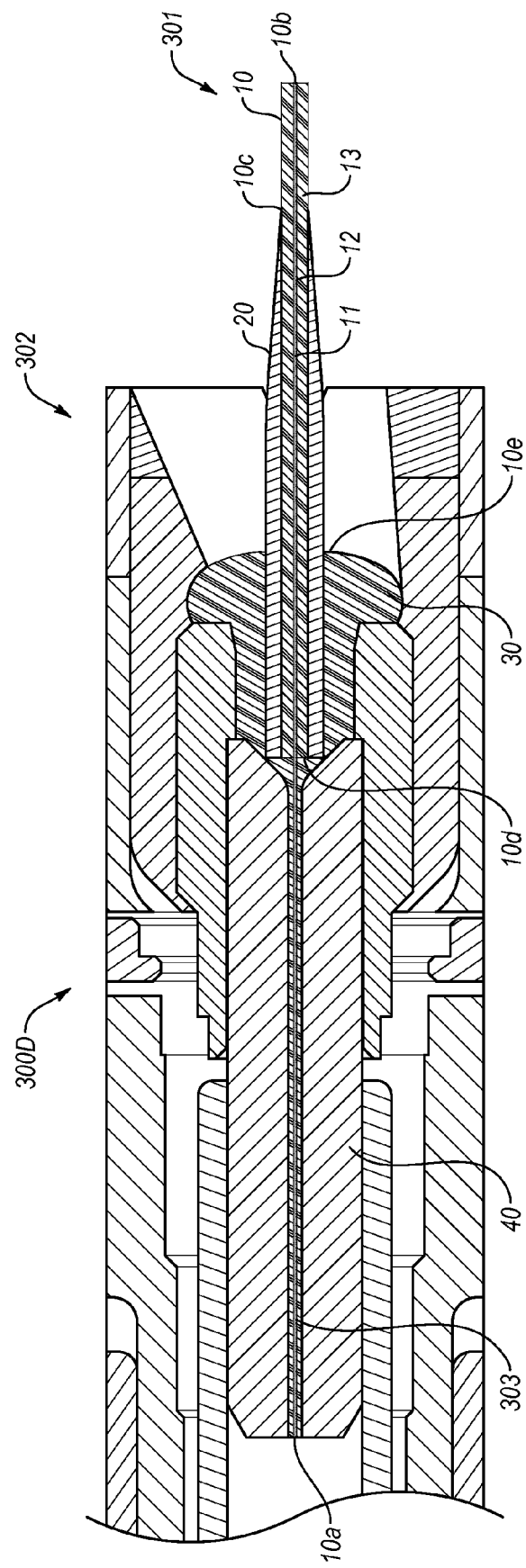

FIGS. 3A-3D illustrate various stages 300A-300D of a method to prepare and/or connect an optical fiber to an optical assembly, arranged in accordance with at least some embodiments described herein. Each of FIGS. 3A-3D includes a cross-sectional side view of various components described herein. In more detail, stage 300A of FIG. 3A illustrates the optical fiber 10 of FIGS. 1A and 1B. Stage 300B of FIG. 3B illustrates the optical fiber cable 100 of FIG. 1A. Stage 300C of FIG. 3C illustrates a stripped optical fiber cable 301 after removal of a portion of the coating 13 from the optical fiber cable 100 of FIG. 3B. Stage 300D of FIG. 3D illustrates an optical fiber assembly 302 that is similar to the optical fiber assembly 200 of FIG. 2. The optical fiber assembly 302 of FIG. 3D includes the stripped optical fiber cable 301 of FIG. 3C, a first length of the rigid epoxy 30, and the ferrule 40.

A length of the optical fiber 10 of FIG. 3A from the first end 10a to a first intermediate point 10c may be dipped into, and subsequently removed from, an uncured flexible epoxy, thereby forming a residual layer of uncured flexible epoxy on the optical fiber 10 from the first end 10a to the first intermediate point 10c. The length of the optical fiber 10 may be dipped in the uncured flexible epoxy a single time or multiple times. The residual layer of uncured flexible epoxy may be cured to form a layer of flexible epoxy 20 that surrounds the optical fiber 10 from the first end 10a to the first intermediate point 10c, thereby forming the optical fiber cable 100 illustrated in stage 300B of FIG. 3B.

Following the step of dipping the optical fiber 10 into the uncured flexible epoxy, but before the step of curing the uncured flexible epoxy, the optical fiber 10 may be suspended vertically such that the first end 10a points downward to allow any excess uncured flexible epoxy to drip away from the optical fiber 10. Accordingly, the residual layer of uncured flexible epoxy on the optical fiber 10 may taper in thickness from the first the first intermediate point 10c such that a diameter of the uncured flexible epoxy may be a first diameter at the first end 10a that tapers down to a smaller second diameter at the first intermediate point 10c. The residual layer of uncured flexible epoxy may subsequently be cured to form the layer of flexible epoxy 20, in which the tapered cross-section is preserved.

After forming the cured layer of flexible epoxy 20, as illustrated in stage 300B of FIG. 3B, lengths of the flexible epoxy 20 and the coating 13 that extend from the first end 10a to a second intermediate point 10d may be stripped or otherwise removed to form the stripped optical fiber cable 301 illustrated in stage 300C of FIG. 3C. The stripped optical fiber cable 301 may include a length of an exposed optical fiber 303; the core 11, the cladding 12, and the coating 13 from the second intermediate point 10d to the second end 10b, and the flexible epoxy 20 from the second intermediate point 10d to the first intermediate point 10c. The length of exposed optical fiber 303 may include the core 11 and the cladding 12 from the first end 10a to the second intermediate point 10d where the flexible epoxy 20 and the coating 13 have been removed. The second intermediate point 10d may be disposed between the first end 10a and the first intermediate point 10c.

As illustrated in stage 300D of FIG. 3D, the length of exposed optical fiber 303 of the stripped optical fiber cable 301 of FIG. 3C may subsequently be coupled within a connection component configured to engage with a port of an optical assembly. The connection component may include the ferrule 40. The ferrule 40, the stripped optical fiber cable 301, and the first length of rigid epoxy 30 may collectively form the optical fiber assembly 302 of FIG. 3D, which is similar to the optical fiber assembly 200 of FIG. 2. In some embodiments, the length of exposed optical fiber 303 may be inserted into the ferrule 40, whereupon the rigid epoxy 30 may be discharged into the ferrule 40 to form the layer of rigid epoxy 30 around the stripped optical fiber cable 301 from the first end 10a to a third intermediate point 10e. Alternatively, the rigid epoxy 30 may be applied to the length of exposed optical fiber 303 to create a layer of rigid epoxy 30 from the first end 10a to the third intermediate point 10e, whereupon the ferrule 40 may be coupled to the layer of rigid epoxy 30. In these and other implementations, the rigid epoxy 30 may bond the exposed optical fiber 303 securely to the ferrule 40. The third intermediate point 10e may be disposed between the first intermediate point 10c and the second intermediate point 10d.

The embodiments may be embodied in other specific forms without departing from its spirit or essential characteristics. The described embodiments are to be considered in all respects only as illustrative and not restrictive. The scope of the embodiments are, therefore, indicated by the appended claims rather than by the foregoing description. All changes which come within the meaning and range of equivalency of the claims are to be embraced within their scope.

What is claimed is:

1. An optical fiber cable, comprising:
    an optical fiber that extends from a first end to a second end, the optical fiber comprising:
        a core that extends from the first end to the second end;
        a cladding that surrounds the core and extends from the first end to the second end; and
        a coating that surrounds the cladding and extends from the first end to the second end; and
    a first length of flexible epoxy that surrounds a length of the coating from the first end to a first intermediate point of the optical fiber,
    wherein the first intermediate point is between the first end and the second end;
    wherein the first length of flexible epoxy does not extend beyond the first intermediate point of the optical fiber; and
    a rigid epoxy that surrounds the lengths of the optical fiber and the flexible epoxy from the first end to a second intermediate point of the optical fiber, the second intermediate point disposed between the first end and the first intermediate point.

2. The optical fiber cable of claim 1, wherein a diameter of the optical fiber including the core, cladding, and coating is approximately 250 micrometers.

3. The optical fiber cable of claim 1, wherein a diameter of the optical fiber cable including the optical fiber and the flexible epoxy is approximately 400 micrometers.

4. The optical fiber cable of claim 1, wherein the first length of flexible epoxy is approximately 30 millimeters in length.

5. The optical fiber cable of claim 1, wherein the first length of flexible epoxy defines a first diameter of approximately 400 micrometers at the first end of the optical fiber and tapers into a second diameter of approximately 25 micrometers at the first intermediate point of the optical fiber.

6. The optical fiber cable of claim 1, wherein the flexible epoxy is defined by a shore hardness ranging between 20 D and 60 D.

7. The optical fiber cable of claim 1, wherein the flexible epoxy is defined by a tensile strength ranging between 15 Newtons per square millimeter (N/mm2) and 21 N/mm2.

8. The optical fiber cable of claim 1, wherein the flexible epoxy is defined by a Young's Modulus ranging between 30 Newtons per square millimeter (N/mm$^2$) and 180 N/mm$^2$.

9. The optical fiber cable of claim 1, wherein the flexible epoxy comprises a light-curable epoxy.

10. The optical fiber cable of claim 1, further comprising a second length of flexible epoxy that extends from the second end of the optical fiber to a third intermediate point of the optical fiber, wherein:
  the second length of flexible epoxy does not extend beyond the third intermediate point of the optical fiber, and
  the third intermediate point is disposed between the first intermediate point and the second end of the optical fiber.

11. An optical fiber cable assembly, comprising:
an optical fiber that extends from a first end to a second end, the optical fiber comprising:
  a core that extends from the first end to the second end;
  a cladding that surrounds the core and extends from the first end to the second end; and
  a coating that surrounds the cladding and extends from a first coating end to a second coating end, the first coating end and the second coating end disposed between the first end and the second end;
a flexible epoxy that surrounds the coating of the optical fiber from the first coating end to a first intermediate point of the optical fiber;
a rigid epoxy that surrounds lengths of the optical fiber and the flexible epoxy from the first end to a second intermediate point of the optical fiber, the second intermediate point disposed between the first coating end and the first intermediate point; and
a ferrule that surrounds the rigid epoxy from the first end to a third intermediate point of the optical fiber, the third intermediate point disposed between the first end and the second intermediate point,
wherein the ferrule is configured to engage with a receptacle of an optical assembly.

12. The optical fiber cable assembly of claim 11, wherein the rigid epoxy extends beyond the ferrule approximately 1 millimeter.

13. The optical fiber cable assembly of claim 11, wherein the flexible epoxy extends beyond the ferrule approximately half of an inch.

14. The optical fiber cable assembly of claim 11, wherein the ferrule is configured to align with a connector plugged into the optical assembly.

15. The optical fiber cable assembly of claim 11, wherein the third intermediate point is disposed between the first coating end and the second intermediate point, such that a portion of the ferrule contacts the flexible epoxy.

16. A method to prepare an optical fiber for connection to an optical assembly, comprising:

dipping a length of the optical fiber from a first end of the optical fiber to a first intermediate point between the first end and a second end of the optical fiber into an uncured flexible epoxy, wherein the optical fiber includes a core that extends from the first end to the second end and is surrounded by a cladding that extends from the first end to the second end and a coating that surrounds the cladding from a first coating end to a second coating end, the first coating end and the second coating end disposed between the first end and the second end;

removing the optical fiber from the uncured flexible epoxy to form a residual layer of uncured flexible epoxy on the optical fiber;

curing the residual layer of uncured flexible epoxy to form a layer of flexible epoxy that surrounds the coating of the optical fiber from the first coating end to the first intermediate point of the optical fiber;

surrounding the optical fiber and the flexible epoxy with a rigid epoxy to create a layer of rigid epoxy from the first end to a second intermediate point of the optical fiber, the second intermediate point disposed between the first coating end and the first intermediate point of the optical fiber; and inserting the optical fiber that is surrounded by rigid epoxy into a ferrule that surrounds the rigid epoxy from the first end to a third intermediate point of the optical fiber, the third intermediate point disposed between the first end and the second intermediate point, the ferrule is configured to engage with a receptacle of the optical assembly.

17. The method of claim 16, further comprising, after removing the length of the optical fiber from the uncured flexible epoxy, suspending the optical fiber vertically such that the first end points downward and uncured flexible epoxy drips away from the first end, such that the residual layer of uncured flexible epoxy is defined by a first diameter at the first end and a second diameter at the first intermediate point, wherein the second diameter is smaller than the first diameter.

18. The method of claim 16, further comprising removing a length of the layer of flexible epoxy and a length of the coating from the first end to a fourth intermediate point to form a length of exposed optical fiber, the fourth intermediate point disposed between the first end and the first intermediate point.

19. The method of claim 18, further comprising:
discharging a rigid epoxy into the ferrule to form a layer of rigid epoxy from the first end to a fifth intermediate point, the fifth intermediate point disposed between the first intermediate point and the fourth intermediate point of the optical fiber.

20. The method of claim 18, further comprising:
surrounding the optical fiber with a rigid epoxy to create a layer of rigid epoxy from the first end to a third intermediate point, the third intermediate point disposed between the first intermediate point and the second intermediate point of the optical fiber; and
surrounding a portion of the layer of rigid epoxy with a ferrule.

* * * * *